(12) United States Patent
de la Iglesia et al.

(10) Patent No.: US 8,214,599 B2
(45) Date of Patent: Jul. 3, 2012

(54) STORAGE DEVICE PREFETCH SYSTEM USING DIRECTED GRAPH CLUSTERS

(75) Inventors: Erik de la Iglesia, San Jose, CA (US); Som Sikdar, San Jose, CA (US)

(73) Assignee: GridIron Systems, Inc., Sunnyvale, CA (US)

( * ) Notice: Subject to any disclaimer, the term of this patent is extended or adjusted under 35 U.S.C. 154(b) by 305 days.

(21) Appl. No.: 12/605,119

(22) Filed: Oct. 23, 2009

(65) Prior Publication Data

US 2010/0115206 A1    May 6, 2010

Related U.S. Application Data

(60) Provisional application No. 61/111,304, filed on Nov. 4, 2008.

(51) Int. Cl.
*G06F 12/00* (2006.01)
(52) U.S. Cl. ........ 711/137; 711/100; 711/136; 711/156; 711/173; 711/204
(58) Field of Classification Search .................. None
See application file for complete search history.

(56) References Cited

U.S. PATENT DOCUMENTS

| | | | |
|---|---|---|---|
| 6,401,147 B1 | 6/2002 | Sang et al. | |
| 6,678,795 B1 * | 1/2004 | Moreno et al. | 711/137 |
| 6,721,870 B1 | 4/2004 | Yochai et al. | |
| 6,789,171 B2 | 9/2004 | Desai et al. | |
| 7,017,084 B2 | 3/2006 | Ng et al. | |
| 7,089,370 B2 | 8/2006 | Luick | |
| 7,856,533 B2 | 12/2010 | Hur et al. | |
| 7,870,351 B2 | 1/2011 | Resnick | |
| 7,873,619 B1 | 1/2011 | Faibish et al. | |
| 7,975,108 B1 * | 7/2011 | Holscher et al. | 711/137 |
| 2003/0012204 A1 | 1/2003 | Czeiger et al. | |
| 2005/0025075 A1 | 2/2005 | Dutt et al. | |
| 2005/0195736 A1 | 9/2005 | Matsuda | |
| 2006/0034302 A1 | 2/2006 | Peterson | |
| 2006/0053263 A1 | 3/2006 | Prahlad et al. | |
| 2006/0075191 A1 | 4/2006 | Lolayekar et al. | |
| 2007/0118710 A1 | 5/2007 | Yamakawa et al. | |
| 2008/0320269 A1 | 12/2008 | Houlihan et al. | |
| 2009/0006745 A1 | 1/2009 | Cavallo et al. | |
| 2009/0110000 A1 | 4/2009 | Brorup | |
| 2009/0276588 A1 | 11/2009 | Murase | |
| 2009/0307388 A1 | 12/2009 | Tchapda | |
| 2010/0080237 A1 | 4/2010 | Dai et al. | |
| 2010/0115211 A1 | 5/2010 | de la Iglesia et al. | |
| 2010/0122020 A1 | 5/2010 | Sikdar et al. | |
| 2010/0125857 A1 | 5/2010 | Dommeti et al. | |
| 2011/0258362 A1 | 10/2011 | McLaren et al. | |

OTHER PUBLICATIONS

Stolowitz Ford Cowger Listing of Related Cases, Feb. 7, 2012.
Rosenblum, Mendel and Ousterhout, John K., The LFS Storage Manager. Proceedings of the 1990 Summer Usenix. 1990 pp. 315-324.

* cited by examiner

*Primary Examiner* — Shawn X Gu

(74) *Attorney, Agent, or Firm* — Stolowitz Ford Cowger LLP

(57) ABSTRACT

A system analyzes access patterns in a storage system. Logic circuitry in the system identifies different address regions of contiguously accessed memory locations. A statistical record identifies a number of storage accesses to the different address regions and a historical record identifies previous address regions accessed prior to the address regions currently being accessed. The logic circuitry is then used to prefetch data from the different address regions according to the statistical record and the historical record.

26 Claims, 8 Drawing Sheets

30

Recorded Events

40

PREFETCH GROUPS

| Recorded Events | Prefetch Groups | | |
|---|---|---|---|
| Event 1<br>Read 100-120 | Create Region 100-120 | | 40A<br>Region 100-120 |
| Event 2<br>Read 120-140 | Expand Region 100-120 to 100-140 | | 40A<br>Region 100-140 |
| Event 3<br>Read 160-180 | Create Region 160-180 | 40A<br>Region 100-140 | 40B<br>Region 160-180 |
| Event 4<br>Read 50-80 | Create Region 50-80<br>40C Region 50-80 | 40A<br>Region 100-140 | 40B<br>Region 160-180 |
| Event 5<br>Read 170-190 | Expand Region 160-180 to 160-190<br>40C Region 50-80 | 40A<br>Region 100-140 | 40B<br>Region 160-190 |
| Event 6<br>Read 30-90 | Expand Region 50-80 to 30-90<br>40C Region 30-90 | 40A<br>Region 100-140 | 40B<br>Region 160-190 |
| Event 7<br>Read 10-70 | Expand Region 30-90 to 10-90<br>40C Region 10-90 | 40A<br>Region 100-140 | 40B<br>Region 160-190 |
| Event 8<br>Read 80-100 | Combine Regions 10-90 and 100-40 into 10-140<br>40A Region 10-140 | | 40B<br>Region 160-190 |

FIG. 2

| Operation Order | Current Operation | Area of Previous Operation | Change to Statistical Record for the Current Area | Change to Historical Record for the Current Area |
|---|---|---|---|---|
| 1 | Read 100 Blocks In Area 40A | None | Add 1 to Total Read Operations 222<br>Add 100 to Total Read Blocks 226 | No change for first operation – no previous operation |
| 2 | Write 100 Blocks In Area 40A | 40A | Add 1 to Total Write Operations 224<br>Add 100 to Total Write Blocks 228 | Create first Record 250 for Area 40A:<br>Area Reference 252 = 40A, Area Count 256 = 1 |
| 3 | Read 100 Blocks In Area 40A | 40A | Add 1 to Total Read Operations 222<br>Add 100 to Total Read Blocks 226 | Modify first Record 250 for Area 40A:<br>Area Reference 252 = 40A, Area Count 256 = 2 |
| 4 | Read 200 Blocks In Area 40B | 40A | Add 1 to Total Read Operations 222<br>Add 200 to Total Read Blocks 226 | Create first Record 250 for Area 40B:<br>Area Reference 252 = 40A, Area Count 256 = 1 |
| 5 | Read 200 Blocks In Area 40B | 40B | Add 1 to Total Read Operations 222<br>Add 200 to Total Read Blocks 226 | Create second Record 250 for Area 40B:<br>Area Reference 252 = 40B, Area Count 256 = 1 |
| 6 | Read 200 Blocks In Area 40B | 40B | Add 1 to Total Read Operations 222<br>Add 200 to Total Read Blocks 226 | Modify second Record 250 for Area 40B:<br>Area Reference 252 = 40B, Area Count 256 = 2 |
| 7 | Write 400 Blocks In Area 40Z | 40B | Add 1 to Total Write Operations 224<br>Add 400 to Total Write Blocks 228 | Create first Record 250 for Area 40Z:<br>Area Reference 252 = 40B, Area Count 256 = 1 |
| 8 | Read 100 Blocks In Area 40A | 40Z | Add 1 to Total Read Operations 222<br>Add 100 to Total Read Blocks 226 | Create second Record 250 for Area 40A:<br>Area Reference 252 = 40Z, Area Count 256 = 1 |

FIG. 6

STORAGE DEVICE PREFETCH SYSTEM USING DIRECTED GRAPH CLUSTERS

This application claims priory to provisional patent application Ser. No. 61/111,304 filed Nov. 4, 2008 and is herein incorporated by reference in its entirety.

BACKGROUND

Prefetching is a caching technique used for improving the performance of disk and memory systems. Nominal caching increases performance by keeping copies of accessed data, in the hope that the cached data will be accessed again. Prefetching loads the caching memory before an access to data, in the hope it will be accessed soon.

The critical information required for a successful prefetch algorithm includes:
  What data to prefetch
  The circumstances under which the prefetch occurs
  The length of time to keep prefetched data cached (if no access occurs)

If the wrong data is prefetched, no accesses to the data will occur and no performance improvements will be realized. Likewise, if the right data is fetched at the wrong time, it may be replaced (by other caching data) before the access occurs. Incorrectly specifying the "keep time" will have a similar effect.

In a storage system, defining a prefetch sequence, effectively guessing what future data accesses will be, is a computationally intensive and sometimes impossible task.

SUMMARY

A novel prefetch scheme reduces the computational complexity and increases the effectiveness of prefetching for storage systems.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 2 shows how prefetch storage regions are created by the storage system in FIG. 1.

FIG. 6 shows in more detail how the statistical and historical records in FIG. 5 are populated.

DETAILED DESCRIPTION

Figure 1:
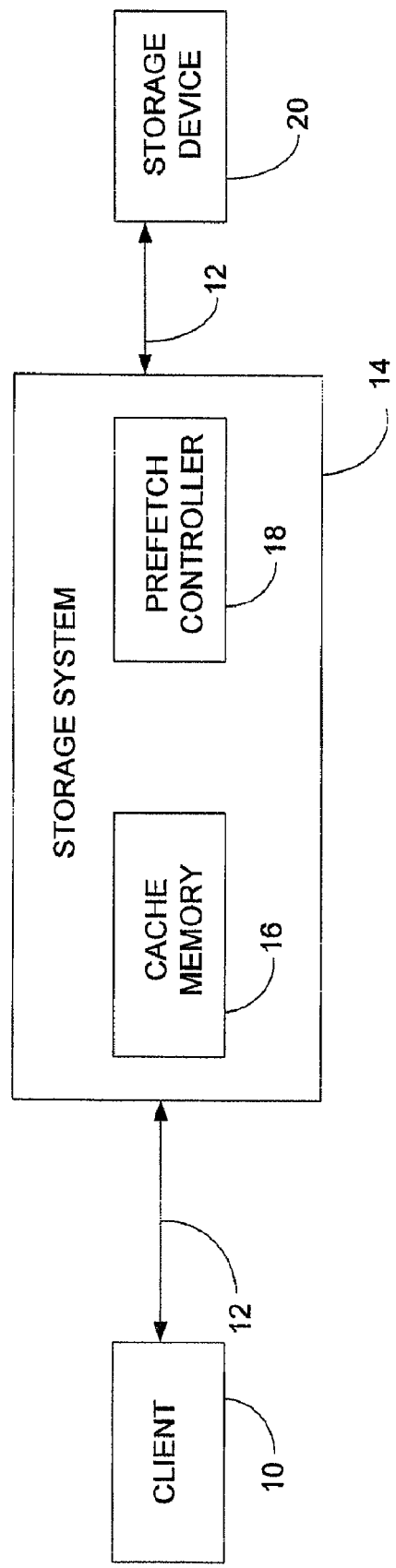
FIG. 1 is a block diagram of a storage system that uses a novel prefetch scheme.

Referring to FIG. 1, a storage system 14 is located between a client 10 and a storage device 20. In one example, the client 10 may be a server, personal computer, Personal Digital Assistant (PDA), or any other wired or wireless computing device that needs to access the data in storage device 20. In one embodiment, the storage system 14 is a stand-alone appliance, device, or blade, and the storage device 20 is a stand-alone storage array. In this embodiment, the client 10, storage system 14, and storage device 20 are each coupled to each other via wired or wireless Internet connections 12.

In another embodiment, the client 10 may be a processor in a personal computer that accesses one or more storage devices 20 over an internal or external data bus. The storage system 14 in this embodiment could be located in the personal computer or server 10, or could also be a stand-alone device coupled to the computer/client 10 via a computer bus or packet switched network connection.

The storage system 14 accepts reads and writes to storage device 20 from client 10. Storage system 14 contains a cache memory 16 used for accelerating the client 10 accesses to storage device 20. In one embodiment, the cache memory 16 could be any combination of Dynamic Random Access Memory (DRAM) and/or Flash memory. The cache memory 16 could be implemented with any memory device that provides relatively faster data access than the storage device 20.

A prefetch controller 18 includes any combination of software and/or hardware within storage system 14 that controls cache memory 16. For example, the prefetch controller 18 could be a processor that executes software instructions to provide the prefetch operations described below.

During a prefetch operation, controller 18 performs one or more reads to storage device 20 and stores the data in cache memory 16. If subsequent reads from client 10 are for the data in cache 16, system 14 returns the data directly from cache memory 16. Such a direct return is referred to as a "cache hit" and improves the performance of applications on client 10 accessing storage device 20. For example, a memory access to storage device 20 can take several milliseconds while a memory access to cache memory 16 may be in the order of microseconds.

Prefetch controller 18 can operate in both a monitoring mode and an active mode. During the monitoring mode, no caching is employed. However, all read and write operations from client 10 to storage device 20 are recorded. The prefetch controller 18 subsequently uses the monitored information to construct a heuristic for performing caching operations. When sufficient information has been gathered, prefetch controller 18 switches from the monitoring mode to an active mode. The active mode performs caching according to the heuristics obtained during the monitoring mode. The prefetch controller 18 performs the following operations:
  recording read and write operations over a period of time;
  aggregation of operations into contiguous groups/clusters/address regions;
  creation of a directed graph linking sequential accesses among prefetch groups;
  reduction of the directed graph into a highly clustered subset; and
  use of the subset of storage address regions to define prefetch behavior.

Recording of storage device accesses is performed by maintaining a log of the time, data address (location of the read or write), and the length of the operation (number of addresses to read or write within one command). The address is often expressed in terms of blocks (such as a read of blocks 100-200) where storage device 20 is viewed as a large contiguous range of blocks. The length of the storage device access operation is similarly expressed as a number of blocks.

Thus, every read or write from client 10 to storage device 20 can be viewed as affecting a block range (from address to address plus length).

A data structure aggregates block ranges over the set of logged transactions. The aggregation combines transactions that occur in adjacent or overlapping block address ranges. For example, a read from X to Y followed by a read from Y to Z is grouped together into an address region defined by the range X to Z. Aggregation continues until all monitored transactions have been placed within a group.

When all of the prefetch groups have been assembled, each transaction is processed again by comparing the address of a particular transaction with the address of a next subsequent transaction. Specifically, each pair of sequential transactions is examined to determine if the respective addresses are part the same prefetch group or belong to different prefetch groups. Because each of the prefetch groups is defined by an address range, this can be determined simply by determining which prefetch group address range "contains" each transaction address.

Each prefetch group contains a pair of counters. A counter 1 is incremented if the two sequential transactions are contained within the same prefetch group. A counter 2 is incremented if the two sequential transactions are not contained within the same prefetch group.

For each prefetch group, the values of counter 1 and counter 2 are examined. Prefetch groups where the ratio of counter 1 to counter 2 is below Threshold 1 are discarded. Threshold 1 is based on mathematical modeling and in one example may have a value is 10. Of course other threshold values could be used and based on memory size, and the types of storage device accesses performed by the client 10.

Any prefetch group where counter 1 is below Threshold 2 is also discarded. Threshold 2 is also based on mathematical modeling and in one example may have a value of 100. The prefetch groups that survive elimination based on the comparisons with Thresholds 1 and 2 are referred to as "highly clustered". The ratio of counter 1 to counter 2 for highly clustered prefetch groups indicates a high probability that any access to an arbitrary prefetch group G will be followed by another access to the same prefetch group G. Furthermore, the high value of counter 1 indicates a probability that many such sequential accesses will be performed on that particular prefetch group G.

The prefetch controller 18 uses the following heuristic to define the prefetch groups. If a storage device access, occurs within the range of any prefetch group G defined by the preceding reduction, the blocks within the entire range of the prefetch group G will be prefetched into cache memory 16 unless these memory blocks already exist within the cache 16.

Creating Prefetch Groups

Figure 3:
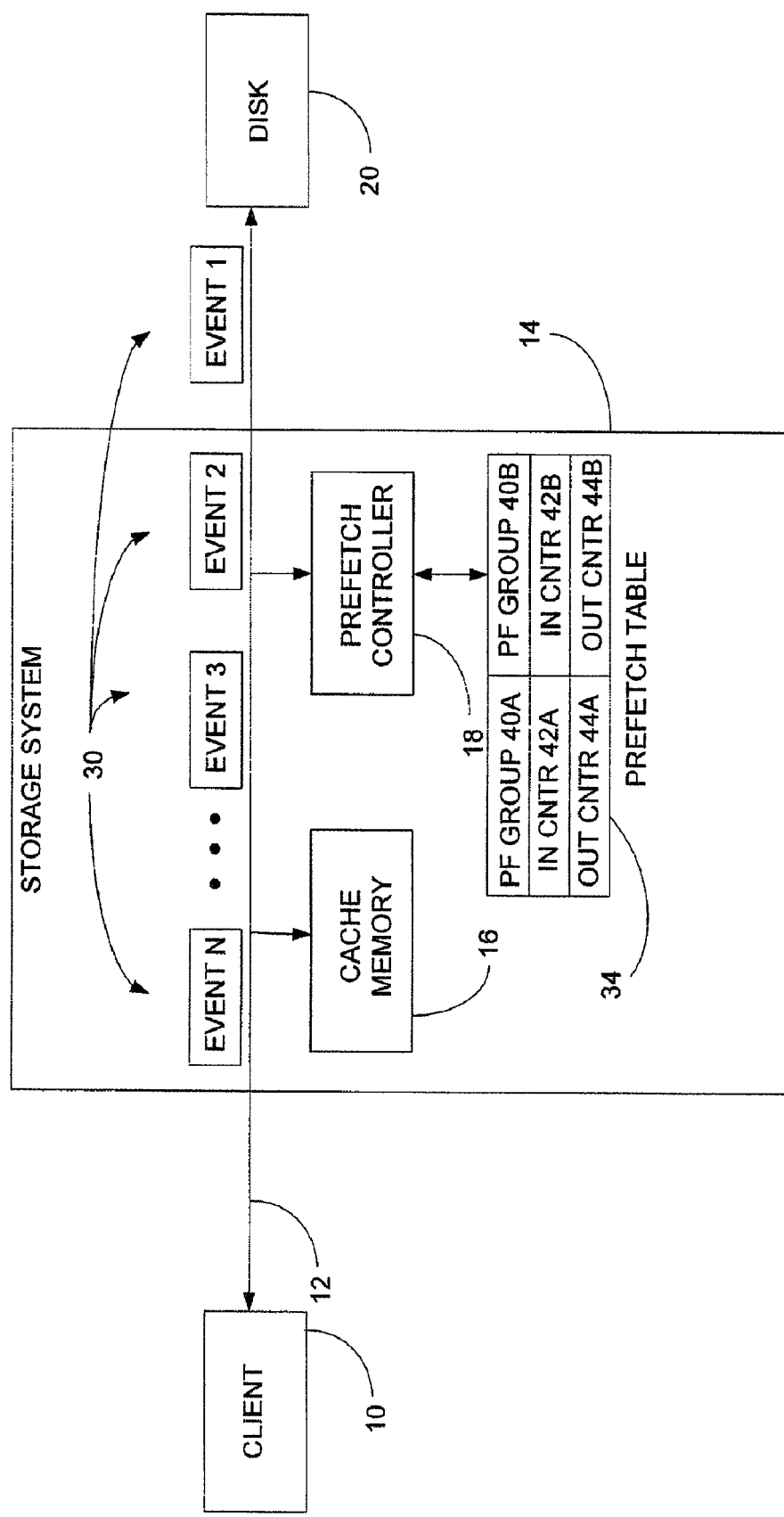
FIG. 3 shows in more detail how the storage system in FIG. 1 identifies the prefetch storage regions.

FIGS. 2 and 3 show an example of a sequence of accesses to the storage device 20. Events 1-8 refer to any read or write operation performed by the client 10 with storage device 20. As mentioned above, the prefetch controller 18 records all read and write operations (events) 30 between the client 10 and storage device 20 over some selected period of time.

The controller 18 then aggregates the events 30 into contiguous prefetch groups/address ranges 40. For example, event 1 reads blocks 100-120 from storage device 20. The controller 18 accordingly recreates a first prefetch group 40A that extends over block address range 100-120. The next event 2 is a read to blocks 120-140 in storage device 20. Because event 2 overlaps with the first address region 100-120, the prefetch group 40A is expanded to address range 100-140.

A next event 3 comprises a read of block address range 160-180. A second prefetch group 40B is created because the address range 160-180 does not overlap with the current address range 100-140 for prefetch group 40A. A third prefetch group 40C is created responsive to the next event 4, because the address range 50-80 for event 4 does not overlap with the address range 100-140 for prefetch group 40A or overlap with the address range 160-180 for prefetch group 40B.

Event 5 overlaps with the current address range 160-180 for prefetch group 40B. Therefore, prefetch group 40B is expanded to 160-190 to include the entire address range for event 5. Similarly, event 6 overlaps with the address range for prefetch group 40C. Accordingly, prefetch group 40C is expanded to 30-90 to also include the entire address range for event 6.

Event 7 overlaps into the expanded address range for prefetch group 40C. Accordingly, prefetch group 40C is again expanded to 10-90 to include the entire address range for event 7. The address range for event 8 overlaps both prefetch group 40A and prefetch group 40C. Accordingly, prefetch groups 40A and 40C are combined into a single prefetch group 40A that extends from the first address 10 in prefetch group 40C to the last address 140 in prefetch group 40A.

At the end of this clustering operation there are two prefetch groups °A and 40B that have block addresses ranges 10-140 and 160-190, respectively. This is of course just one example, and any number of prefetch groups may exist after the preliminary clustering operations described above.

After the prefetch groups 40A and 40B have been assembled, each transaction 30 is processed again by comparing a particular transaction address with the address of the next subsequent transaction. As described above, each pair of sequential transactions is examined to determine if the respective addresses for the two transactions are in the same group or in different groups. For example, event 1 resides within prefetch group 40A.

The next sequential transaction for event 2 also resides within prefetch group 40A. Accordingly, an in counter 42A in FIG. 3 associated with two sequential accesses to the same prefetch group 40A is incremented.

The next sequential transaction for event 3 moves outside of prefetch group 40A into prefetch group 40B. Accordingly, a second out counter 44A associated with a transaction that extends outside of prefetch group 40A is incremented.

The next sequential transaction for event 4 moves outside of prefetch group 40B and back into prefetch group 40A. Accordingly, an out counter 44B in FIG. 3 is incremented corresponding with two sequential transactions that exit prefetch group 40B. The counters 42 and 44 are incremented as described above until the storage device access events 30 have all been reprocessed.

As described above, the prefetch controller 18 then compares the counters 42 and 44 for each prefetch group 40 with predetermined thresholds. Any prefetch group 40 with a ratio between values in associated counters 42 and 44 below a first threshold 1 are discarded. This represents a prefetch group where there are relatively few accesses before there is another access to a different prefetch group.

Any prefetch groups 40 that have a value in associated in-counter 42 that is below a second threshold 2 are also discarded. This represents a prefetch group where there are relatively few accesses.

The remaining surviving prefetch groups 40 are referred to as highly clustered. This is because the ratio of values in associated counters 42 and 44 indicates a high probability that any access to one of the surviving prefetch groups 40 will likely be followed by another access to that same prefetch group. The highly clustered prefetch groups 40 are stored in a table 34 and used by the prefetch controller 18 for prefetching data from storage device 20 into cache memory 16.

Prefetching Based on Highly Clustered Prefetch Groups

Figure 4:
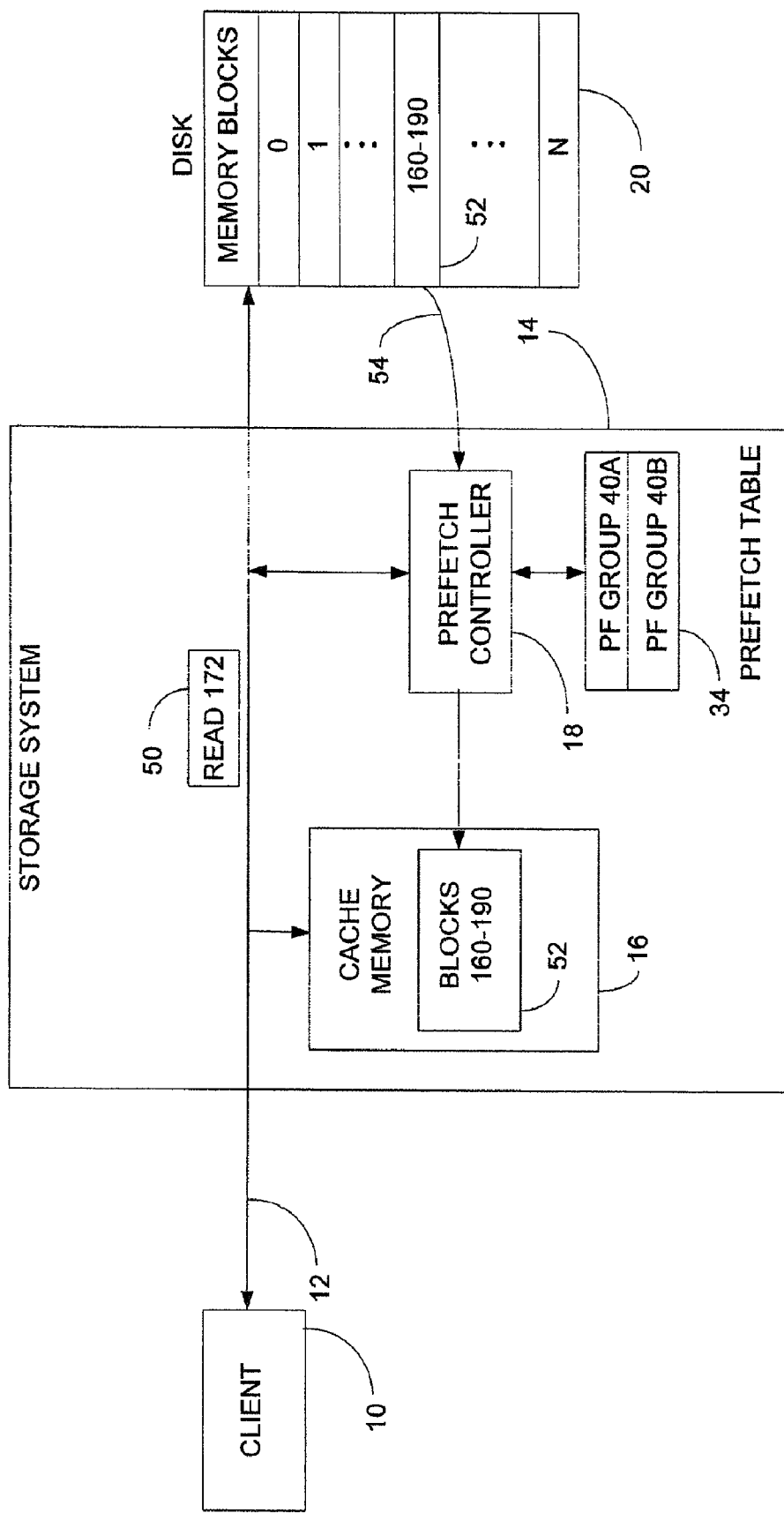
FIG. 4 is another diagram showing how the storage system conducts prefetches according to the prefetch storage regions derived in FIGS. 2 and 3.

Referring to FIG. 4, it is assumed that both prefetch groups 40A and 40B qualified as being "highly clustered". During a subsequent normal memory access operation, the client 10 performs a read operation 50 to memory block 172 in storage device 20. The prefetch controller 18 compares the address in read operation 50 with the prefetch groups 40A and 40B in table 34.

Memory block 172 referenced by read operation 50 is a member of prefetch group 40B in FIG. 2. This causes the prefetch controller 18 to perform a prefetch operation 54 that loads the data 52 from memory blocks 160-190 in storage device 20 into cache memory 16. The prefetched data 52 in cache 16 is then supplied to the client 10 for any subsequent operations that access memory blocks 160-190.

Some specific advantages is that prefetching of the blocks from storage device 20 are a sequential (ordered) operation which is normally significantly faster than random operations within a block range. Furthermore, all subsequent accesses to the highly clustered blocks, which were deemed highly likely by the heuristic technique, can likely be served from cache memory 16. Without this technique, storage device 20 would likely have to satisfy many more of the potentially random data access operations. This would result in higher latency and lower throughput.

Statistical and Historical Records

Figure 5:
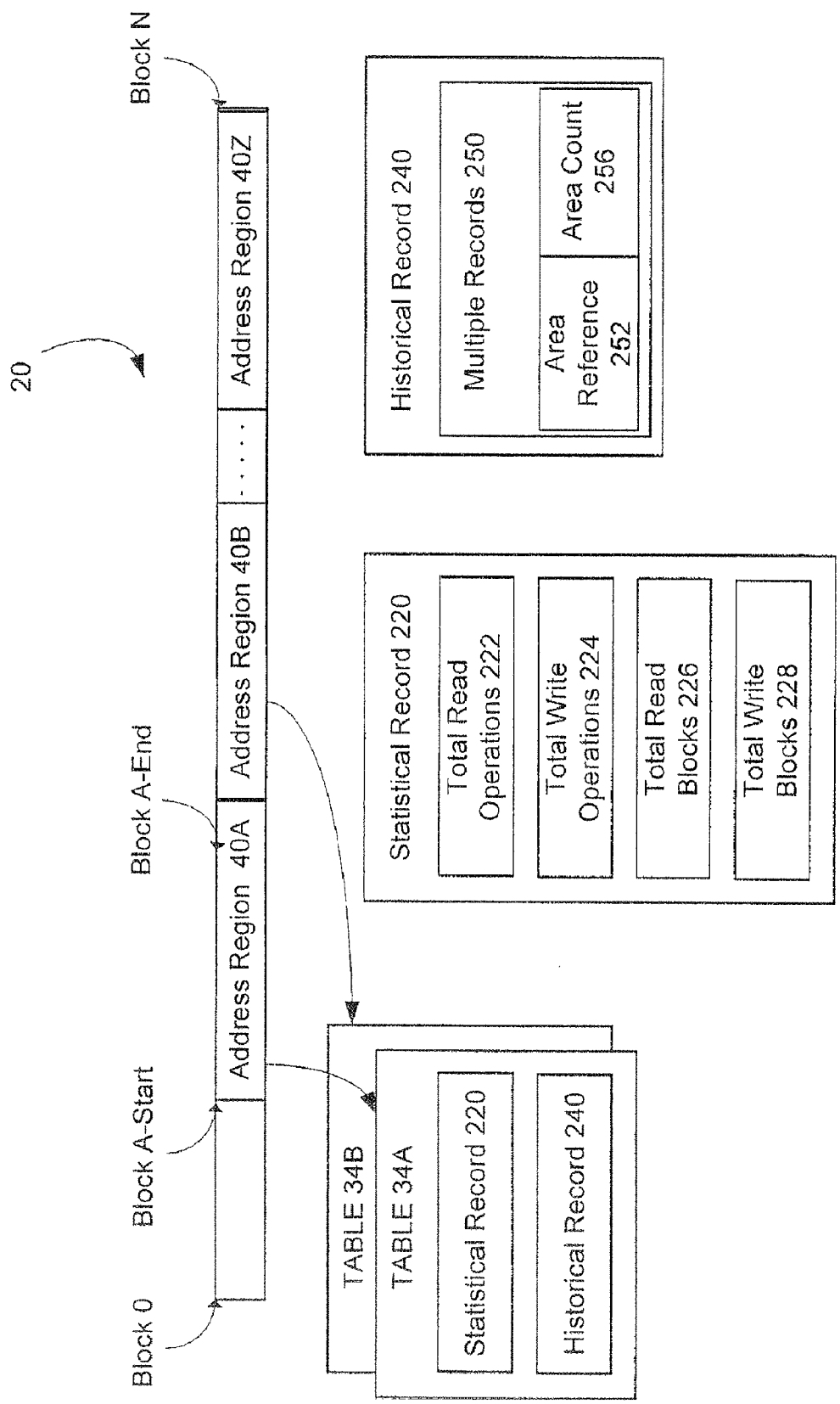
FIG. 5 shows how different statistical and historical records are used for prefetching.

Referring to FIG. 5 and as discussed above, the storage device 20 may be partitioned in to multiple different blocks 0-N each comprising a particular amount of storage space. Particular groups of blocks are logically grouped together into highly clustered address regions/areas 40 according to the previously monitored read and write access patterns by one or more clients 10 (FIG. 1) as described above in FIGS. 2-4. Each address region has a particular starting block address and a particular ending block address.

Each of the different clustered address regions 40 has an associated table 34 that includes a statistical record 220 and a historical record 240. The statistical record 220 may include a count for a total number of read operations 222 and a count for a total number of write operations 224 associated with a particular address region 40. The number of read operations is tracked in a register 222 and the write operations tracked in a register 224 over any configurable time period. For example, per minute, hour, day, etc. The number of total read operations 222 and total write 224 can also be tracked at any configurable time. For example, during work hours, weekends, particular times of the month, etc.

A total number of read blocks are tracked in a register 226 and a total number of write blocks are tracked in a register 228 for each address region 40. For example, a first read operation may read 100 blocks from address region 40A and a second read operation may read 50 blocks from address region 40A. The total read operations in register 222=2 and the total read blocks in register 226=150.

A historical record 240 is also kept for each address region 40 and includes a finite number of sub-records 250 each associated with a different one of the address regions 40. In one example, the number of sub-records 250 is 4. However, any finite number of sub-records 250 may be used. The multiple sub-records 250 each include one or more area reference identifiers 252 that identify the address regions 40 that were previously accessed prior to accessing the address region associated with the historical record 240. For example, there may be a read access to address region 40A and then a read access to address region 40B. The controller 18 in FIG. 1 identifies the historical record 240 associated with address region 40B and then increments the area count register 256 for the sub-record 250 in historical record 240 having area reference register 252=40A.

There may be billions or more blocks in a storage device 20. Maintaining tables 34 and records 220 and 240 for each block would not scale and could require too much processing bandwidth for practical utilization. However, at any one time, there may be magnitudes fewer address regions/clusters identified within the storage device 20. Accordingly, tables 34 and the associated records 220 and 240 can be maintained for each address region 40 without placing a substantial burden on the processing capacity of the storage system 14. As explained above, the number of sub-records 250 in historical record 240 may be limited, in one example, to 4. The sub-records 250 can be replaced with other sub-records for other address regions that have higher values in the area count registers 256.

FIG. 6 is a flow chart describing one example of how the controller 18 in FIG. 4 manages the tables 34 in storage system 14. Referring to FIGS. 5 and 6, in operation 1, 100 blocks are read from area 40A. A value of 1 is added to the total number of read operations in register 222 and a value of 100 is added to the total number of read blocks in register 226. Because this is a first operation, there is no previous operation performed in any address region 40. Accordingly, there are no changes to any historical records 240.

In operation 2, 100 blocks are written into address region 40A. The controller 18 (FIG. 4) adds a value of 1 to the total number of write operations in register 224 and adds a value of 100 to the total number of write blocks counted in register 228. The previous memory access operation 1 happened in address region 40A. Thus, a first sub-record 250 is created in the historical record 240 for area 40A. The controller 18 sets the area reference register 252=40A for the first sub-record 250 and increments the area count register 256=1.

In operation 3, another 100 blocks are read from address region 40A. The controller 18 increments the total number of read operations in register 222 to 2 and adds a value of 100 to the total number of read blocks counted in register 226. The previous memory access in operation 2 happened in address region 40A. Thus, the area count register 256 for the already created sub-record 250 with area reference register 252=40A is incremented again so that area count register 256=2.

In operation 4, 200 blocks are read from address region 40B. The controller 18 locates the statistical record 220 associated with address region 40B and increments the total number of read operations in register 222 by 1 and adds a value of 200 to the total number of read blocks counted in register 226. This is the first time that address region 40B was accessed. Accordingly, the controller 18 creates a first sub-record 250 for address region 40B. The processor determines that the storage access prior to accessing address region 40B was to address region 40A. Thus, an area reference register 252 is set to 40A and the associated area count register 256 is incremented to 1.

Operation 5 reads 200 blocks from address region 40B. The controller 18 increments the total number of read operations in register 222 for address region 40B by 1 and adds a value of 200 to the total number of read blocks counted in the register 226 for address region 40B. The previous memory access operation 4 also happened in address region 40B. Thus, the controller 18 creates a second sub-record 250 for address region 40B. The second sub-record 250 identifies the previous access to address region 40B by setting area reference register 252=40B and increments the area count register 256=1 for the newly created sub-record 250.

Operation 6 reads 200 blocks from address region 40B. The controller 18 increments the total number of read operations in the register 222 associated with address region 40B by 1 and adds a value of 200 to the total number of read blocks counted in the register 226 associated with address region 40B. The previous memory access in operation 5 happened in address region 40B. Thus, the area count register 256 for the already created sub-record 250 with area reference register 252=40B is incremented again so that the area count register 256=2.

In operation 7, 400 blocks are written to address region 40Z. The controller 18 locates the statistical record 220 associated with address region 40Z and increments the total number of write operations in the register 224 associated with address region 40Z by 1 and adds a value of 400 to the total number of write blocks counted in register 228. This is the first time that address region 40Z is accessed. Accordingly, the controller 18 creates a first sub-record 250 for area 40Z. The area reference register 252 is set to 40B and the area count register 256 is set to 1 for the newly created sub-record 250.

In operation 8, 100 blocks are read from address region 40A. The controller 18 locates the statistical record 220 associated with address region 40A and increments the total number of read operations in register 222 by 1 and adds a value of 100 to the total number of read blocks counted in register 226. The previous memory access in operation 7 happened in address region 40Z. There have been no previous accesses from address region 40Z to address region 40A. Thus, a second sub-record 250 is created for address region 40A with area reference register 252=40Z and the area count register 256=1.

Figure 7:
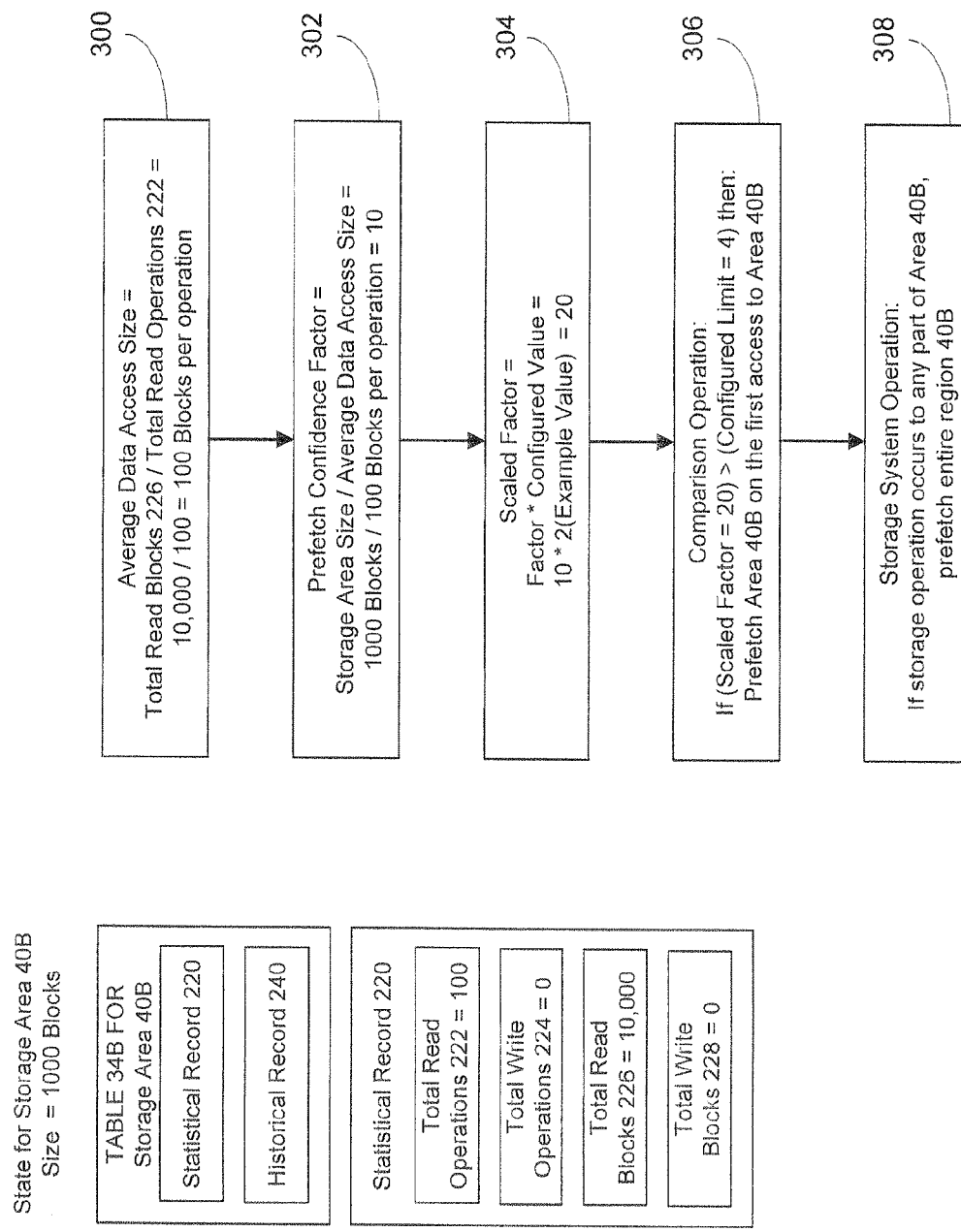
FIG. 7 is a flow chart showing one example of how the statistical record in FIG. 5 is used for prefetching.

FIG. 7 explains how the statistical records 220 are used for determining when an address region/storage cluster 40 is appropriate for prefetching. A current state for the address region 40B is shown on the left side of FIG. 7. In the current state there have been 100 total read operations recorded in register 222 and 10,000 total read blocks recorded in register 226 for address region 40B over a particular time period.

In operation 300, the controller 18 in FIG. 4 determines an average data access size for address region 40B as the ratio of total read blocks 226/total read operations 222=10,000/100=100 blocks per operation. Operation 302 determines a prefetch confidence factor based on a ratio between the storage area size for address region 40B and the average data access size determined in operation 300. In this example, the confidence factor=storage area size/average data access size=1000 Blocks/100 blocks per operation=10.

The prefetch confidence factor provides an estimation of whether or not the address region 40B is going to be read again in the same way. Or in other words, the prefetch confidence factor indicates a likelihood that the address region is read in a repetitive manner. A higher prefetch confidence factor indicates an address region that would be a good candidate for a prefetch operation. A low confidence factor indicates a address region that would not be a good candidate for prefetching.

Operation 304 scales the prefetch confidence factor by some configured value that may change according to available resources in the storage system 14 (FIG. 1). For example, there may be different amounts of local memory available in different storage systems that may allow different amounts of prefetching. Accordingly, some storage systems may have different thresholds levels for prefetching. In another example, there may be particular times of the day when relatively few memory accesses are taking place and more memory resources might typically be available during those time periods. The scaling in operation 304 allows decisions regarding perfetching to be adapted and optimized to different storage system conditions.

Operation 306 compares the scaled prefetch confidence factor with a configured limit which in this example is the value 4. The configured limit identifies a threshold for prefetching or not prefetching an address region 40. Since the scaled prefetch confidence factor is larger than the limit 4 in operation 306, the entire address region 40B is prefetched on the first access to address region 40B. Accordingly, in operation 308, the controller 18 monitors for storage accesses by client 10 (FIG. 1). If any storage access operation occurs in any part of address region 40B, the controller 18 prefetches the entire address region 40B.

Figure 8:
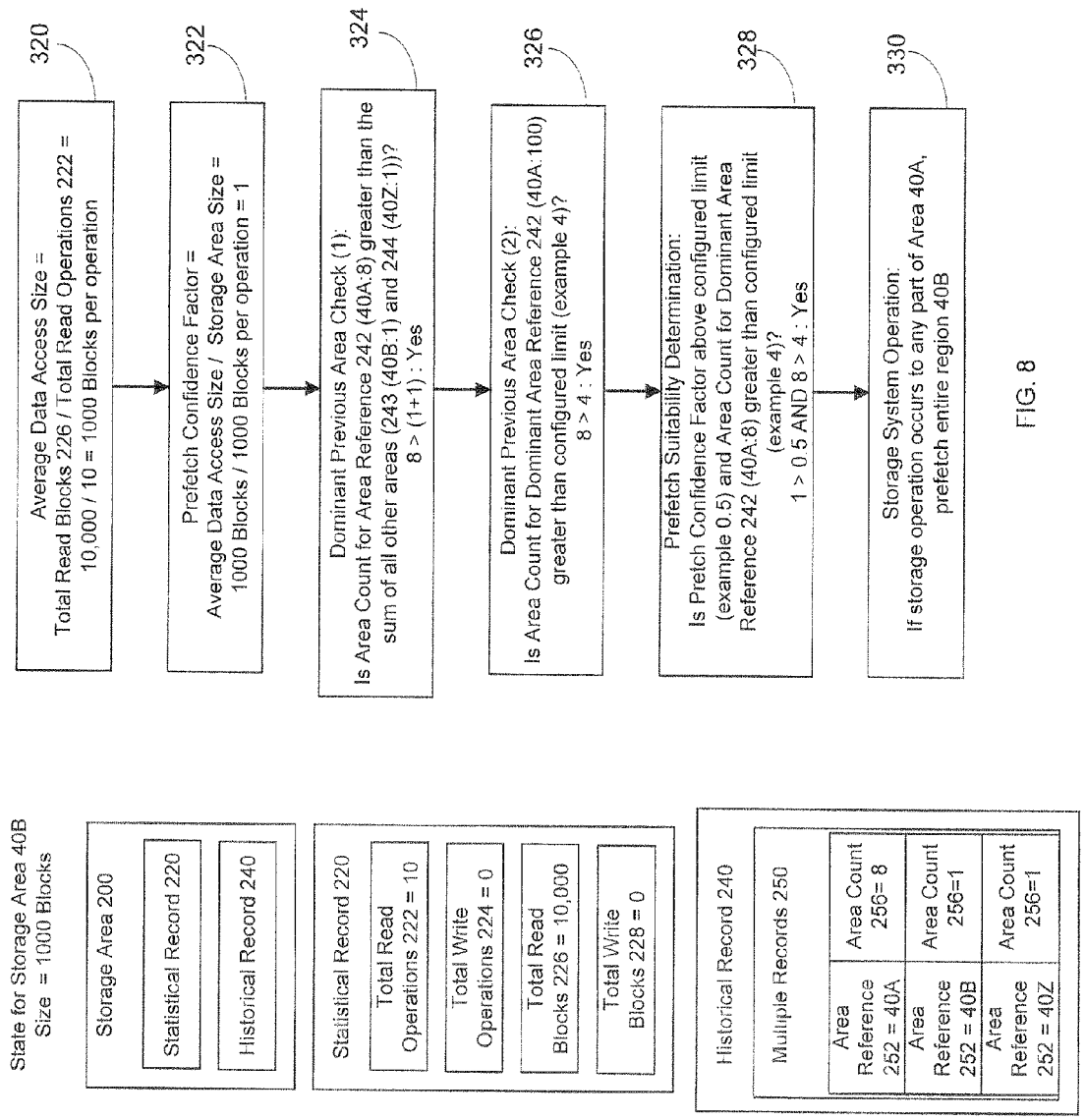
FIG. 8 is a flow chart showing one example of how the historical chart in FIG. 5 is used for prefetching.

FIG. 8 describes another pre-fetch scheme that can be used in conjunction or independently from the pre-fetch scheme described in FIG. 7. In FIG. 8, both the statistical record 220 and the historical record 240 are used to pre-fetch an address region different from the address region currently being accessed.

The left side of FIG. 8 shows a current state of the statistical record 220 and the historical record 240 for address region 40B. The statistical record 220 indicates total read operations in register 222=10 and total read blocks in register 226=10, 000. The historical record 240 for address region 40B includes three different sub-records 250 with area reference register 252=40A with an area count register 256=8, area reference register 252=40B with area count register 256=1, and area reference register 252=40Z with an area count register 256=1.

Operation 320 again calculates an average data access size by taking the ratio of the count of the total read blocks in register 226 with the number of total read operations in register 222. In this example, average data access size=total real blocks 226/total read operations 222=10,000/10=1000 blocks per operation.

A prefetch confidence factor is determined in operation 322 that indicates a likelihood that the address region 40B will be frequently accessed from another address region. For example, a particular address region may be accessed a large number of times relative to the address region size. This relatively large number of accesses indicates that it is less likely that accesses to that particular address region came from any particular dominate previous address region. In other words, if there are relatively few accesses to a particular address region, it is more likely that a previous memory access came from a particular one of the other address regions.

A first stage of a dominant previous area check is performed in operation 324. In one example, this is performed by comparing the area count in register 256 for each of the sub-records 250 with a sum of all other area counts for the same historical record 240.

For example, it is determined that the area count in register 256 for address region 40A is greater than the sum of the area counts for address regions 40B and 40Z. Register 252=40A, area count=8>register 252=40B, area count=1+register 252=40Z, area count=1. Therefore, reference area 40A is identified as a potential dominant previous address region in operation 324.

In operation 326 the controller 18 performs a second dominant address region check by comparing the area count for area reference register 252=40A with a preconfigured limit. In this case the preconfigured limit=4 and is used to determine that the dominant previous address region 40A has been detected as the previous address region at least a minimum number of times, i.e., area count=8>4.

Operation 328 performs a final pre-fetch suitability determination. If the prefetch confidence factor determined in operation 322 is above a configured limit (example 0.5) and the area count register 256 for address region 40A=8 is greater than the configured 4, then the prefetch controller 18 in operation 330 prefetches the entire address region 40B whenever there is a storage access in any part of address region 40A. The prefetch controller 18 may than attach a tag to address region 40A that directs the prefetch controller 18 to prefetch address region 40B.

Thus, the storage system 14 described above provides dynamic determination of address regions/block clusters for contiguously accessed blocks of storage. These address regions are then dynamically analyzed to determine their suitability for prefetch operations whenever that particular address region is accessed. Different associations between the address regions are analyzed to determine if an address region, other than the currently accessed address region, should be prefetched.

Any number of different address regions might be linked together and be triggered for prefetching based on an access to a particular address region. For instance, the example described above in FIG. 8 determined that address region 40B should be prefetched whenever address region 40A is accessed. However, the statistical record 220 and historical record 240 for address region 40Z may indicate that address region 40Z should be prefetched whenever address region 40B is accessed. Accordingly, the access to address region 40A may trigger the prefetching of both address region 40B and address region 40Z.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We/I claim all modifications and variation coming within the spirit and scope of the following claims.

The invention claimed is:

1. A system for analyzing access patterns in a storage system, comprising:
   logic circuitry configured to identify different address regions of contiguously accessed memory locations, wherein the different address regions comprise variable length address regions for overlapping memory location accesses;
   a statistical record identifying a number of storage accesses to the different address regions; and
   a historical record identifying previous address regions accessed prior to address regions currently being accessed;
   wherein the logic circuitry is configured to prefetch data from the different address regions according to the statistical record and the historical record.

2. The system of claim 1 wherein the statistical record identifies a total number of read and write storage accesses to each of the different address regions.

3. The system of claim 1 wherein the statistical record includes a total number of storage blocks accessed in each of the different address regions for both read and write storage accesses.

4. A system for analyzing access patterns in a storage system, comprising:
   logic circuitry configured to identify different address regions of contiguously accessed memory locations;
   a statistical record identifying a number of storage accesses to the different address regions; and
   a historical record identifying previous address regions accessed prior to address regions currently being accessed;
   wherein the logic circuitry is configured to prefetch data from the different address regions according to the statistical record and the historical record and use storage block addresses and storage block address ranges to identify the different address regions.

5. The system of claim 4 wherein the logic circuitry is configured to group all storage block addresses within a particular one of the storage block address ranges within that particular one of the storage block address ranges.

6. The system of claim 4 wherein the logic circuitry is configured to merge two storage block address ranges into a single one of the storage block address ranges when one of the storage block addresses bridges across the two storage block address ranges.

7. The system of claim 4 wherein the logic circuitry is configured to identify the storage block addresses that overlap a particular one of the storage block address ranges and add non-overlapping portions of the storage block addresses to an address range of the particular one of the storage block address ranges.

8. A system for analyzing access patterns in a storage system, comprising:
   logic circuitry configured to identify different address regions of contiguously accessed memory locations;
   a statistical record identifying a number of storage accesses to the different address regions; and
   a historical record identifying previous address regions accessed prior to address regions currently being accessed;
   wherein the logic circuitry is configured to prefetch data from the different address regions according to the statistical record and the historical record and the statistical record includes a histogram identifying a size of all read and write storage accesses to a storage area.

9. A system for analyzing access patterns in a storage system, comprising:
   logic circuitry configured to identify different address regions of contiguously accessed memory locations;
   a statistical record identifying a number of storage accesses to the different address regions; and
   a historical record identifying previous address regions accessed prior to address regions currently being accessed;
   wherein the logic circuitry is configured to prefetch data from the different address regions according to the statistical record and the historical record and the historical record includes multiple sub-records that each identify one of the previous address regions accessed prior to one of the address regions currently being accessed.

10. The system of claim 9 wherein the logic circuitry is configured to remove a least frequently used one of the multiple sub-records and replace it with a new sub-record associated with a more recently accessed one of the previous address regions.

11. The system of claim 10 wherein the logic circuitry is configured not to remove sub-records that reach a predetermined count limit.

12. The system of claim 11 wherein the logic circuitry is configured to replace sub-records despite reaching the predetermined count limit when other sub-records associated with a same one of the different address regions reach a second higher count limit.

13. A system for analyzing access patterns in a storage system, comprising:
   logic circuitry configured to identify different address regions of contiguously accessed memory locations;
   a statistical record identifying a number of storage accesses to the different address regions; and
   a historical record identifying previous address regions accessed prior to address regions currently being accessed;
   wherein the logic circuitry is configured to:
      prefetch data from the different address regions according to the statistical record and the historical record;
      receive a stream of storage operations;
      identify types of storage accesses associated with the storage operations;
      identify an address and block count associated with the storage operations; and
      dynamically adjust the different address regions, the statistical record, and the historical record according to the types of storage accesses, the address, and the block count identified with the storage operations.

14. The system of claim 13 wherein the stream of storage operations comprise real-time storage operations being serviced by the storage system.

15. The system of claim 13 wherein the storage system is located between a client and a storage device and the storage system dynamically derives and uses the different address regions, statistical record, and historical record to prefetch data from the different address regions in the storage device according to the stream of storage operations received from the client.

16. A method for operating a storage system, comprising:
   monitoring data accesses;
   determining an average data size for the data accesses;
   creating a prefetch confidence factor according to the average data size; and
   performing prefetch operations responsive to the data accesses according to the prefetch confidence factor.

17. The method of claim 16 wherein the average data size is a ratio between a total number of read or write blocks accessed during the data accesses and a total number of read or write operations performed during the data accesses.

18. The method of claim 16 wherein the prefetch confidence factor is a ratio between the average data size and a size of a storage region associated with the data accesses.

19. The method from claim 16 further comprising:
   determining a scaled prefetch confidence factor according to operating conditions of a storage system coupled between a client that issues the data accesses and a storage device; and
   issuing prefetch operations in response to the data accesses according to a comparison of the scaled prefetch confidence factor and a configured value.

20. The method from claim 16 further comprising:
   receiving data accesses from a client;
   determining prefetch confidence factors for different address regions associated with the data accesses from the client; and
   issuing prefetch operations to the different address regions according to the determined prefetch confidence factors.

21. A computer readable medium containing instructions configured to be executed by a computer system, the instructions when executed by the computer system comprising:
   determining average data sizes for storage accesses to different storage areas;
   associating prefetch confidence factors with the different storage areas according to the average data sizes;
   identifying dominant prior storage areas that are accessed prior to storage accesses to the different storage access areas; and
   prefetching the different storage areas responsive to storage accesses to associated dominant prior storage areas and according to the prefetch confidence factors associated with the different storage access areas.

22. The computer readable medium of claim 21 further comprising determining the average data sizes by dividing a total number of blocks read or written to the different storage areas by a total number of read or write storage accesses to the different storage areas.

23. The computer readable medium of claim 21 further comprising deriving the prefetch confidence factors by dividing the average data sizes for the different storage areas by storage area sizes for the different storage areas.

24. The computer readable medium of claim 21 further comprising historical records containing identifiers identifying prior storage areas accessed prior to storage areas associated with the historical records and a count identifying a number of times the prior storage areas were previously accessed.

25. The computer readable medium of claim 21 wherein the identified dominant prior storage areas are determined by:
   comparing a prefetch confidence factor for a particular one of the storage areas with a first configured limit;
   determining that a count for a dominant one of prior storage areas is above a second configured limit; and
   determining that a sum of counts for all other prior storage areas for the particular one of the storage areas is less than the count for the dominant one of the prior storage areas.

26. The computer readable medium of claim 21 wherein a storage system operated by the execution of the instructions is configured to:
   receive a storage operation;
   perform a prefetch suitability calculation for a storage area accessed by the storage operation; and
   issue a prefetch operation for a storage area different from the storage area accessed by the storage operation according to the prefetch suitability calculation.

* * * * *

UNITED STATES PATENT AND TRADEMARK OFFICE
CERTIFICATE OF CORRECTION

PATENT NO. : 8,214,599 B2
APPLICATION NO. : 12/605119
DATED : July 3, 2012
INVENTOR(S) : de la Iglesia et al.

Page 1 of 1

It is certified that error appears in the above-identified patent and that said Letters Patent is hereby corrected as shown below:

Column 11, line 54, in Claim 19, delete "from" and insert -- of --, therefor.

Column 12, line 4, in Claim 20, delete "from" and insert -- of --, therefor.

Signed and Sealed this
Fourth Day of December, 2012

David J. Kappos
*Director of the United States Patent and Trademark Office*